(12) United States Patent
Yamamoto

(10) Patent No.: US 8,696,018 B2
(45) Date of Patent: Apr. 15, 2014

(54) FIXING CLIP AND CURTAIN AIRBAG FIXING APPARATUS

(71) Applicant: Kazuhito Yamamoto, Toyota (JP)

(72) Inventor: Kazuhito Yamamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/838,009

(22) Filed: Mar. 15, 2013

(65) Prior Publication Data

US 2013/0257025 A1 Oct. 3, 2013

(30) Foreign Application Priority Data

Mar. 30, 2012 (JP) ................. 2012-079112

(51) Int. Cl.
*B60R 21/16* (2006.01)

(52) U.S. Cl.
USPC ...................................... 280/728.2

(58) Field of Classification Search
USPC ............... 280/728.2, 728.1; 24/293, 297
See application file for complete search history.

(56) References Cited

U.S. PATENT DOCUMENTS

| | | | |
|---|---|---|---|
| 7,900,953 B2 * | 3/2011 | Slobodecki et al. | 280/728.2 |
| 8,220,827 B2 * | 7/2012 | Schirm | 280/728.2 |
| 8,297,646 B2 * | 10/2012 | Aoki | 280/728.2 |
| 2005/0062263 A1 | 3/2005 | Kawai et al. | |
| 2006/0171793 A1 | 8/2006 | Kawai et al. | |
| 2006/0261580 A1 * | 11/2006 | Tiesler et al. | 280/730.2 |
| 2007/0241540 A1 * | 10/2007 | Takemura et al. | 280/728.2 |
| 2008/0014045 A1 | 1/2008 | Kawai | |
| 2010/0172714 A1 | 7/2010 | Sano | |
| 2012/0313354 A1 * | 12/2012 | Ochiai et al. | 280/728.2 |
| 2012/0313355 A1 * | 12/2012 | Grabowski et al. | 280/728.2 |

FOREIGN PATENT DOCUMENTS

| | | |
|---|---|---|
| JP | A-2005-047325 | 2/2005 |
| JP | A-2006-207607 | 8/2006 |
| JP | A-2008-020006 | 1/2008 |
| JP | A-2010-144900 | 7/2010 |
| JP | A-2011-255775 | 12/2011 |

* cited by examiner

*Primary Examiner* — Faye M. Fleming
(74) *Attorney, Agent, or Firm* — Oliff PLC

(57) ABSTRACT

A fixing clip includes a clip body and a lock pin. The lock pin is temporarily held by the clip body at a temporary holding position and is securely held by the clip body at a secure holding position. When the lock pin is positioned at the temporary holding position, an entirety of the lock pin is located within the clip body. The clip body includes a rectangular body head, a body leg and a lock pin inserting hole. The body head includes side walls extending in a longitudinal direction of the rectangular body head on opposite sides of the lock pin inserting hole. Thus, when the lock pin is positioned at the temporary holding position, the lock pin is suppressed from being erroneously inserted to the secure holding position.

8 Claims, 8 Drawing Sheets

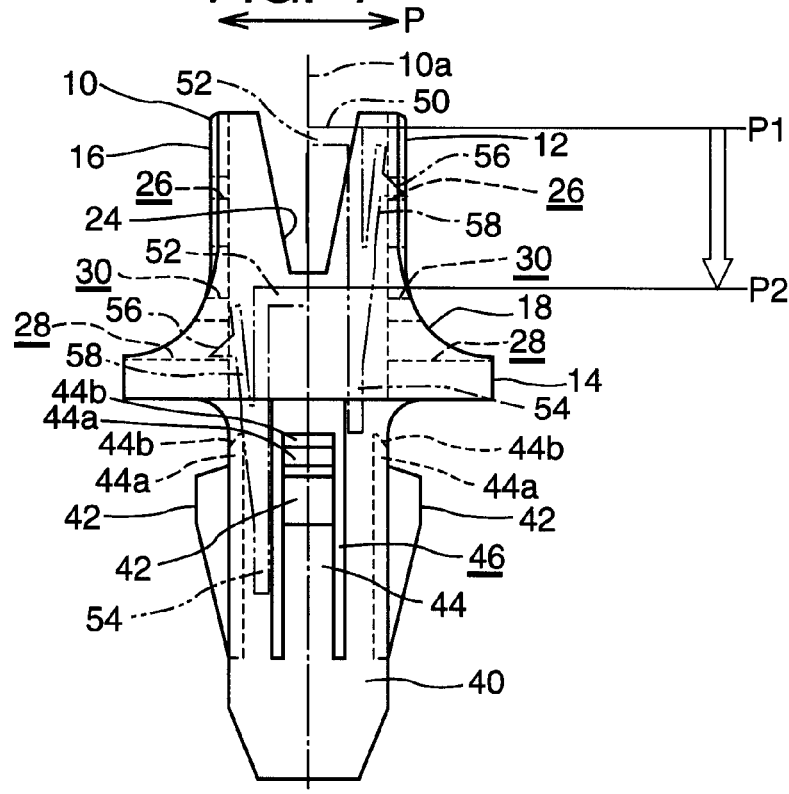
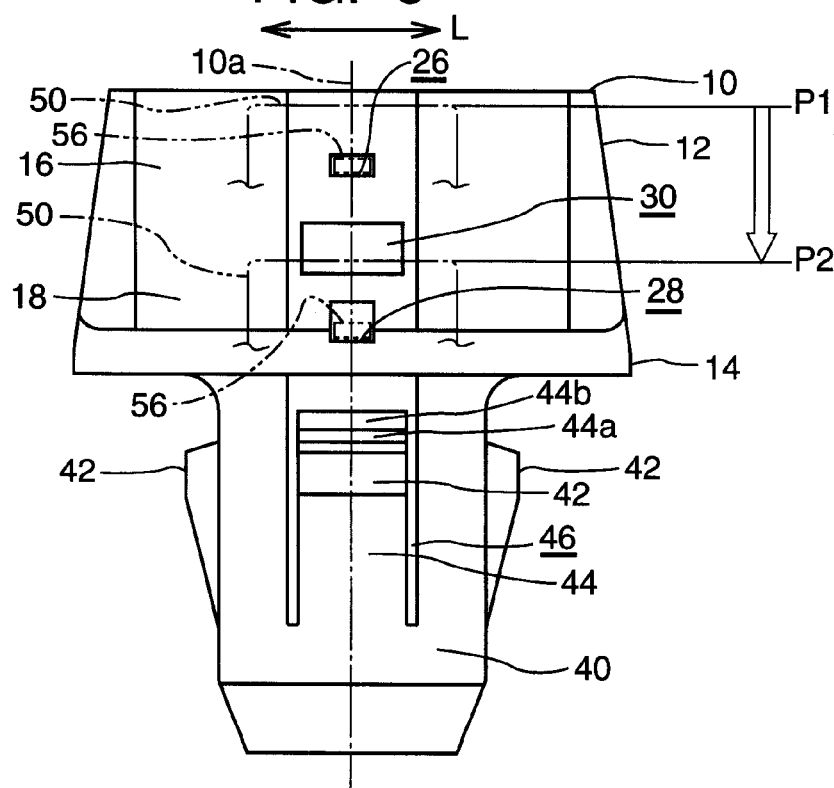

FIXING CLIP AND CURTAIN AIRBAG FIXING APPARATUS

CROSS-REFERENCE TO RELATED APPLICATIONS

This application claims priority to Japanese Patent Application No. 2012-079112 filed on Mar. 30, 2012, the entire content of which is incorporated herein by reference.

BACKGROUND

The disclosure relates to a fixing clip of a lock pin-type and a curtain airbag fixing apparatus using the fixing clip. The curtain airbag may be called "CSA," which is an abbreviation of Curtain Shield Airbag. A CSA fixing clip will be taken as an example of the fixing clip of a lock pin-type hereinafter.

JP-A-2011-255775 discloses a conventional fixing clip of a lock pin-type for fixing a CSA to a vehicle body, e.g., to an inner panel of a front pillar (an A-pillar, hereinafter). Further, JP-A-2010-144900 discloses another conventional CSA fixing clip which can be fixed to a vehicle body even by a relatively small load.

As illustrated in FIGS. 10 and 11, the CSA fixing clip 100 of JPA-2011-255775 includes a clip body 110 and a lock pin 150 which is a member separate from the clip body 110. The clip body 110 includes a body head 112 and a body leg 140. The clip body 110 includes a lock pin inserting hole 120 which is formed in the clip body 110 and is open to an outside at a body leg opposite-side end of the body head.

The lock pin 150 is inserted into the lock pin inserting hole 120 and is held by the clip body 110. The lock pin 150 is temporarily held by the clip body 110 at a temporary holding position PA where a pin head is positioned at an insertion position that is substantially midway into the lock pin inserting hole 120. The lock pin 150 is securely or finally held by the clip body 110 at a secure holding position PB where the pin head is fully inserted into the lock pin inserting hole 120.

At the temporary holding position PA, the head of the lock pin 150 protrudes outwards from the body head 112, and at the secure holding position PB, the lock pin 150 is positioned within the lock pin inserting hole 120. The lock pin inserting hole 120 is open not only in an axial and upward direction but also in lateral directions including a longitudinal direction L of the CSA and a direction P perpendicular to the longitudinal direction L of the CSA through grooves 124A and 124B formed at the body head 112.

The CSA fixing clip 100 and the CSA are fixed to a vehicle body as follows: Firstly, the body leg 140 of the clip body 110 temporarily holding the lock pin 150 is inserted through a hole formed at a tab of the CSA. Then, the clip body 110 is pinched by fingers and is pushed so that the leg 140 passes through the clip mounting aperture of the vehicle body. At that time, an engagement hook 142 of the body leg 140 is elastically deformed toward an axis of the clip body so that the engagement hook 142 can pass through the clip mounting aperture of the vehicle body. After having passed though the clip mounting aperture, the engagement hook 142 elastically returns to an original position so that the clip body 110 engages and is fixed to a clip mounting aperture-defining edge of the vehicle body.

Then, the lock pin 150 is moved relative to the clip body 110 from the temporary holding position PA to the secure holding position PB by pushing the lock pin 150 by a jig. When the lock pin 150 is positioned at the secure holding position PB, a lower end portion of a leg 154 of the lock pin 150 is located inside the engagement hook 142 and prevents the engagement hook 142 from being elastically deformed inward so that the clip body 100 is prevented from slipping out from the vehicle body. In this way, fixing of the clip 100 to the vehicle body and fixing of the CSA by the CSA fixing clip 100 are completed. Then, an A-pillar garnish is coupled to the A-pillar.

However, with the conventional CSA fixing clip 100, there are the following problems to be addressed:

When fixing the clip body 110 to the vehicle body, the lock pin 150 may happen to be erroneously pushed to move from the temporary holding position PA to the secure holding position PB or to a midway position between the temporary holding position PA and the secure holding position PB, before the leg 140 passes through the clip mounting aperture of the vehicle body. In addition, the lock pin 150 may happen to be pushed to the secure holding position PB due to the receipt of vibration or impact during transportation. When the lock pin happens to be erroneously pushed to the secure holding position PB before the leg 140 passes through the clip mounting aperture, the engagement hook 142 cannot be deformed inward and cannot pass through the clip mounting aperture so that the clip 100 cannot be mounted to the vehicle body.

The causes for such an erroneous insertion of the lock pin 150 are as follows: (i) When the lock pin 150 is positioned at the temporary holding position PA, the lock pin 150 protrudes upward more than the body head 112 of the clip body 110. As a result, the lock pin 150 can be easily touched with the jig or a finger.

(ii) Since the lock pin inserting hole 120 is open not only in the axial and upward direction but also in the lateral direction through the groove 124B, an opening of the clip body 110 is large. As a result, when the clip body 110 is pinched by fingers and a load for causing the clip body to pass through the clip mounting aperture is loaded on the clip body, the lock pin 150 is easily pushed by the fingers.

(iii) A load for inserting the lock pin 150 from the temporary holding position PA to the secure holding position PB is equal to or smaller than a load for causing the body leg 140 of the clip body to pass through the clip mounting aperture, i.e., an inserting load of the clip body. As a result, when the load for causing the body leg 140 of the clip body to pass through the clip mounting aperture is loaded on the clip body 110, if the jig or a finger touches the lock pin 150, the lock pin 150 will be easily moved from the temporary holding position PA to the secure holding position PB.

SUMMARY

An object of the present invention is to provide a fixing clip of a lock-pin type and a CSA fixing apparatus capable of suppressing erroneous insertion of a lock pin.

A fixing clip and a CSA fixing apparatus according to at least some aspects of the present invention for achieving the above-described object can include one or more of the following features.

(1) A fixing clip according to some embodiments of the present invention includes a clip body and a lock pin. The lock pin is temporarily held by the clip body at a temporary holding position at which the lock pin is inserted partially into a receiving hole of the clip body and is securely held by the clip body at a secure holding position where insertion of the lock pin into the clip body is completed. When the lock pin is positioned at the temporary holding position, an entirety of the lock pin is located inside the clip body.

(2) According to further aspects, in a fixing clip according to item (1) above, the clip body includes a body head having a rectangular configuration when viewed in a direction along an axis of the clip body and a body leg connected to the body head. The clip body includes a lock pin inserting hole which extends over the body head and the body leg and is open to an outside at a body leg opposite-side end of the body head. The body head has side walls extending in a longitudinal direction of the rectangular configuration of the body head on opposite sides of the lock pin inserting hole in a direction perpendicular to the longitudinal direction of the rectangular configuration of the body head.

(3) According to further aspects, in a fixing clip according to item (2) above, a space between inner surfaces of the side walls is set at a dimension larger than a width of a jig which is narrower than a width of a human finger and at a dimension smaller than the width of the human finger.

(4) According to further aspects, in a fixing clip according to item (3) above, each of the side walls has a longitudinally central portion and a longitudinally end portion in the longitudinal direction of the rectangular configuration of the body head. The space between the inner surfaces of the side walls is made larger at the longitudinally central portion of the side walls than at the longitudinally end portion of the side walls. The space between the inner surfaces of the side walls is set at a dimension larger than the width of the jig and at a dimension smaller than the width of the human finger both at the longitudinally central portion of the side walls and at the longitudinally end portion of the side walls.

(5) According to further aspects, in a fixing clip according to item (4) above, each of the side walls has a temporary holding aperture and a secure holding aperture formed at the longitudinally central portion of each of the side walls. The lock pin includes a pin head with a rectangular configuration having a long side and a pin leg connected to the pin head at the long side of the pin head and extending along a pin axis. The pin leg includes a pin deformable portion and a pin hook formed at the pin deformable portion and protruding in a direction away from the pin axis. The temporary holding aperture is provided at such a position as to not cause a top surface of the pin head of the lock pin to protrude outward more than a tip of the body head in a direction away from the body leg.

(6) According to further aspects, in a fixing clip according to item (5) above, the body leg includes a body deformable portion. The clip body includes a back-up rib located in the lock pin inserting hole and a space located between the body deformable portion and the back-up rib, and the clip body may be inserted with the lock pin. When the pin hook is positioned at the temporary holding aperture, a lower end of the pin leg is positioned higher than an upper end of the body deformable portion so that the body deformable portion is elastically deformable toward the axis of the clip body. When the pin hook is positioned at the secure holding aperture, a lower end of the pin leg is positioned lower than an upper end of the body deformable portion so that the body deformable portion is not elastically deformable toward the axis of the clip body.

(7) According to further aspects, in a fixing clip according to item (2) or (3) above, when a clip body inserting load is loaded on the clip body, the clip body is fixed to a vehicle body at a clip mounting aperture-defining edge of the vehicle body. When a lock pin inserting load is loaded on the lock pin, the lock pin is moved from the temporary holding position to the secure holding position and is held by the clip body. The lock pin inserting load is set higher than the clip body inserting load.

(8) A curtain airbag fixing apparatus according to at least some aspects of the invention includes a vehicle body including a clip mounting aperture, a curtain airbag, and the fixing clip according to any one of items (1)-(7) above, for fixing the airbag to the vehicle body at a clip mounting aperture-defining edge of the vehicle body.

According to the fixing clip of item (1) above, since an entirety of the lock pin is located inside the clip body, the lock pin does not protrude upward beyond the clip body when the lock pin is positioned at the temporary holding position. As a result, when the clip body is fixed to the vehicle body, the jig or the finger is prevented from erroneously contacting the lock pin located at the temporary holding position. Thus, the lock pin is prevented from being moved from the temporary holding position to the secure holding position. Therefore, a situation in which it becomes impossible to insert the clip into the clip mounting aperture of the vehicle body, which may happen when the lock pin is erroneously inserted, is avoided.

According to the fixing clip of item (2) above, the body head has the side walls extending in the longitudinal direction of the rectangular configuration of the body head on opposite sides of the lock pin inserting hole. As a result, when the clip body is pinched at the side walls and is pushed into the clip mounting aperture of the vehicle body, the finger or the jig is prevented from touching the lock pin positioned at the temporary holding position and from erroneously pushing the lock pin from the temporary holding position to the secure holding position.

According to the fixing clip of items (3) or (4) above, the space between inner surfaces of the side walls is set at a dimension larger than the width of the jig which is narrower than the width of the human finger and at a dimension smaller than the width of the human finger. As a result, the lock pin is not pushed by one's finger. Thus, an erroneous insertion of the lock pin is further suppressed.

According to the fixing clip of item (5) above, since the temporary holding aperture is provided at the above-defined position, the top surface of the pin head of the lock pin does not protrude outward more than from the tip of the body head in the direction away from the body leg when the pin hook protrudes into the temporary holding aperture.

According to the fixing clip of item (6) above, since the body deformable portion is elastically deformable toward the axis of the clip body when the pin hook protrudes into the temporary holding aperture, the body engagement hook can pass through the clip mounting aperture of the vehicle body. Further, since the body deformable portion is not deformable toward the axis of the clip body when the pin hook protrudes into the secure holding aperture, the fixing clip is locked to the vehicle body so as to be non-removable from the vehicle body.

According to the fixing clip of item (7) above, the lock pin inserting load is set higher than the clip body inserting load. As a result, when the clip body is pushed into the clip mounting aperture of the vehicle body, even if the clip body inserting load is erroneously loaded on the lock pin, the lock pin is prevented from being moved to the secure holding position.

According to the fixing apparatus of item (8) above, since the CSA is fixed to the vehicle body using the CSA fixing clip according to any one of items (1)-(7) above, difficulty in fixing the CSA to the vehicle body due to an erroneous insertion of the lock pin can be solved.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which:

FIG. 7 is a side view of the fixing clip (the CSA fixing clip) of FIG. 1 when viewed along arrow A in FIG. 1.

FIG. 8 is a front view of the fixing clip (the CSA fixing clip) of FIG. 1 when viewed along arrow B in FIG. 1.

DETAILED DESCRIPTION OF EMBODIMENTS

A fixing clip (a CSA fixing clip) 1 according to an embodiment of the present invention and a CSA fixing apparatus 2 for fixing a CSA to a vehicle body, e.g., an A-pillar using the fixing clip will be explained with reference to FIGS. 1-9. In some of FIGS. 1-9, "L" shows a longitudinal direction of the CSA, and "P" shows a direction perpendicular to the longitudinal direction of the CSA. Further, in FIG. 9, "FR" shows a front direction of a vehicle, and "IN" shows an inward direction in a right-left direction of the vehicle.

Figure 9:
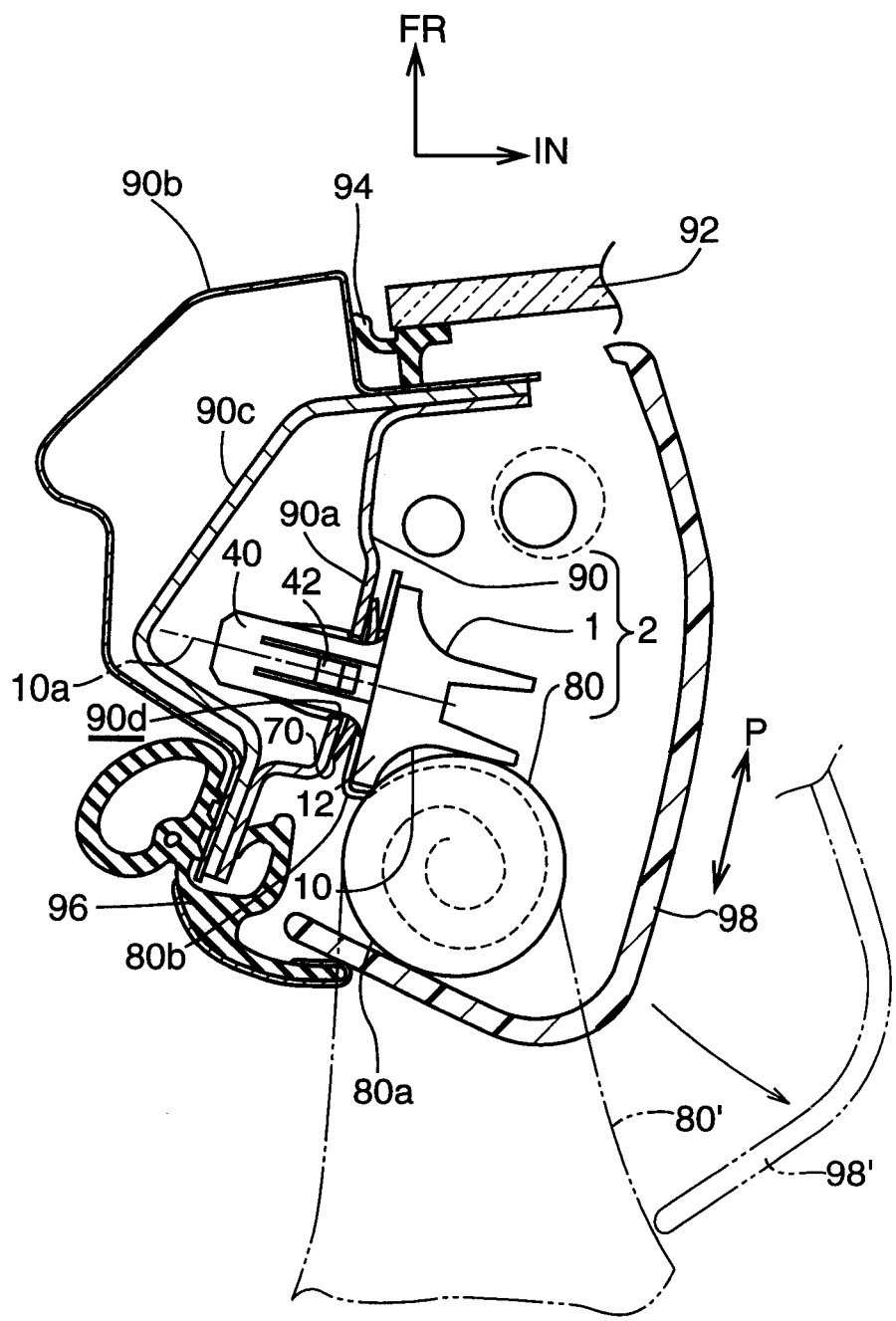
FIG. 9 is a cross-sectional view of a CSA fixing apparatus when viewed in a longitudinal direction of the CSA.

As illustrated in FIG. 9, the CSA fixing apparatus 2 includes the CSA 80, the vehicle body 90 and the fixing clip (the CSA fixing clip) 1 for fixing the CSA 80 to the vehicle body 90. The fixing clip (the CSA fixing clip) 1 may be simply called a clip 1, hereinafter. FIG. 9 discloses also a front shield glass 92, weather strips 94 and 96, and a pillar garnish 98.

The vehicle body 90 to which the CSA 80 is fixed is an A-pillar. However, the vehicle body is not limited to the A-pillar. In an explanation below, the A-pillar is taken as an example of the vehicle body to which the CSA 80 is fixed. The A-pillar includes an inner panel 90a, an outer panel 90b and a reinforcement 90c.

The CSA 80 includes a CSA body 80a and a tab 80b. The CSA 80 is made from cloth. The CSA 80 is housed at a space formed between the A-pillar garnish 98 and the inner panel 90a formed in a rolled or folded condition. A cross-sectional configuration of the CSA body 80a is circular as shown in FIG. 9 when the CSA is rolled, and is rectangular when the CSA is folded. The CSA body 80a is located at a front glass-opposite side (i.e., a rear side) of the clip 1 and extends along a longitudinal direction L of the CSA.

Figure 1:
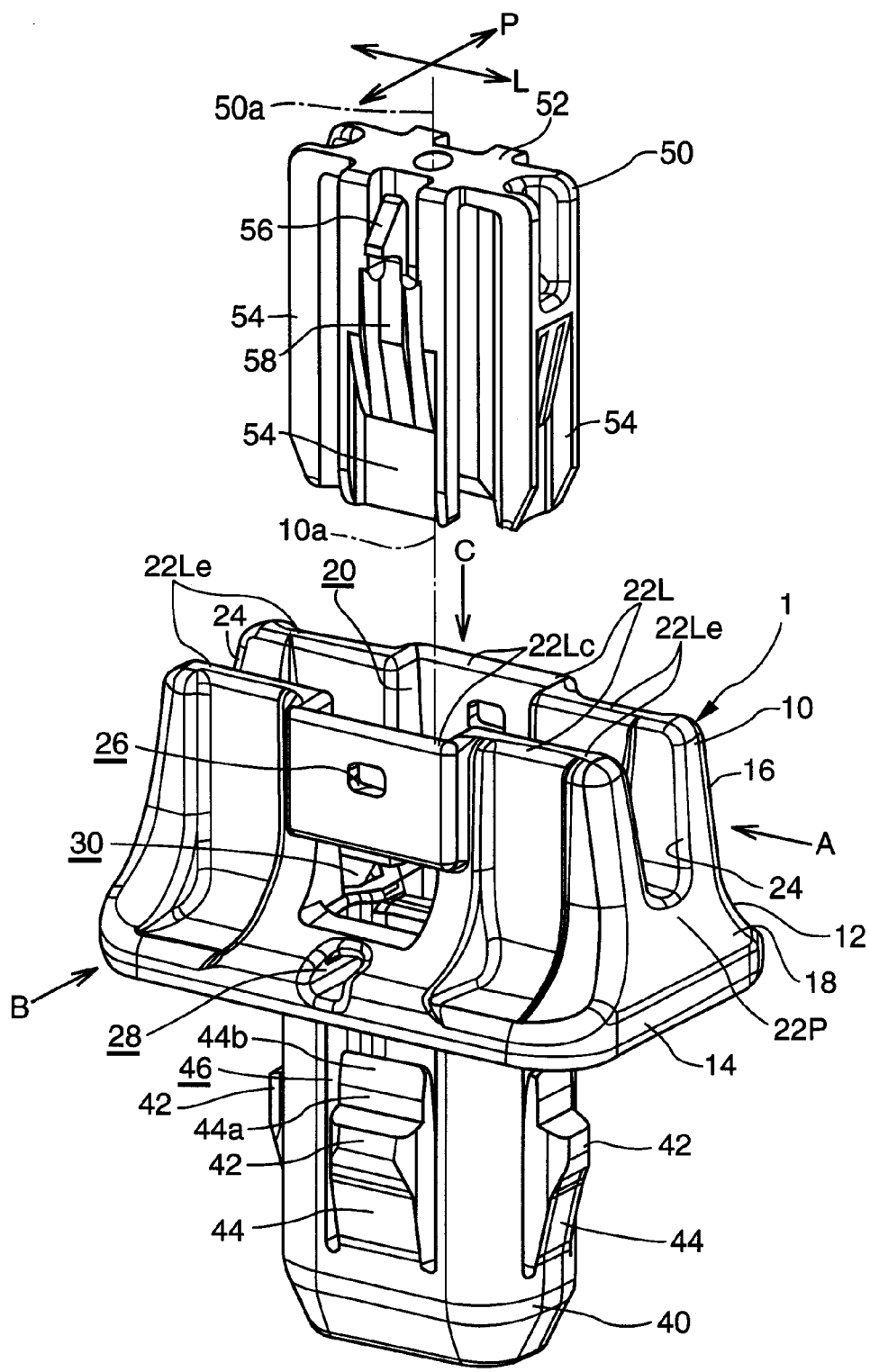
FIG. 1 is a perspective view of a fixing clip (a CSA fixing clip) before inserting a lock pin into the lock pin inserting hole of a body head, according to an embodiment of the present invention.

As illustrated in FIG. 1, the fixing clip (the CSA fixing clip) 1 includes a clip body 10 and a lock pin 50 which is a member separate from the clip body 10. The clip body 10 and the lock pin 50 are made from synthetic resin having an elasticity. The synthetic resin may be, for example, polyhexamethylene adipamide. The synthetic resin may be a material other than the polyhexamethylene adipamide, as long as the material is a synthetic resin having the necessary elasticity and strength. The clip body 10 includes a body head 12 and a body leg 40.

As illustrated in FIG. 9, the clip body 10 is coupled to the inner panel 90a by disposing the tab 80b of the CSA 80 and a pushing plate (or a spacer) 70 made from synthetic resin between the body head 12 and the inner panel 90a and causing the body leg 40 to extend through the clip mounting aperture 90d formed at the inner panel 90a, directing the body head 12 inside the vehicle body (i.e., toward the A-pillar garnish 98).

As illustrated in FIG. 9, when a vehicle is impacted, an expansion gas is supplied to the CSA 80 from an inflator (not shown) so that the CSA 80 is expanded. The expansion pressure pushes the A-pillar garnish 98 in a direction away from the inner panel 90a. The CSA 80 is expanded through a clearance formed between the A-pillar garnish 98 and the inner panel 90a into a passenger room and to a space between a passenger and a side door of the vehicle and protects the passenger from the side of the side door. In FIG. 9, reference numeral 98' shows the pushed A-pillar garnish 98 and reference numeral 80' shows the expanded CSA 80.

FIGS. 1-8 illustrate a structure of the fixing clip (the CSA fixing clip) 1. The body head 12 and the body leg 40 have a rectangular configuration in a plane perpendicular to an axis 10a (FIGS. 1-3 and 7-9) of the clip body. When the CSA 80 is installed in the vehicle body, a direction where a long side of the rectangular configuration of the body head 12 extends and a direction where the CSA body 80a extends are parallel with each other.

As illustrated in FIGS. 1-8, the body head 12 includes a flange (i.e., a seat portion) 14 perpendicular to the axis 10a of the clip body, a narrow-width portion 16 located on a side of the flange 14 opposite the body leg 40, and a connecting portion 18 connecting the narrow-width portion 16 and the flange 14. In a direction P perpendicular to the longitudinal direction of the CSA, a width of the narrow-width portion 16 is smaller than a width of the flange 14. Thus, as illustrated in FIG. 9, a configuration of a cross section of the CSA 80 can be positioned close to the axis 10a of the clip body 10 so that a width of the A-pillar garnish 98 can be made narrow and a sight field viewed from a driver can be increased. A width of the connecting portion 18 in the direction P perpendicular to the longitudinal direction of the CSA is increased in a direction from the narrow-width portion 16 toward the flange 14.

Figure 2:
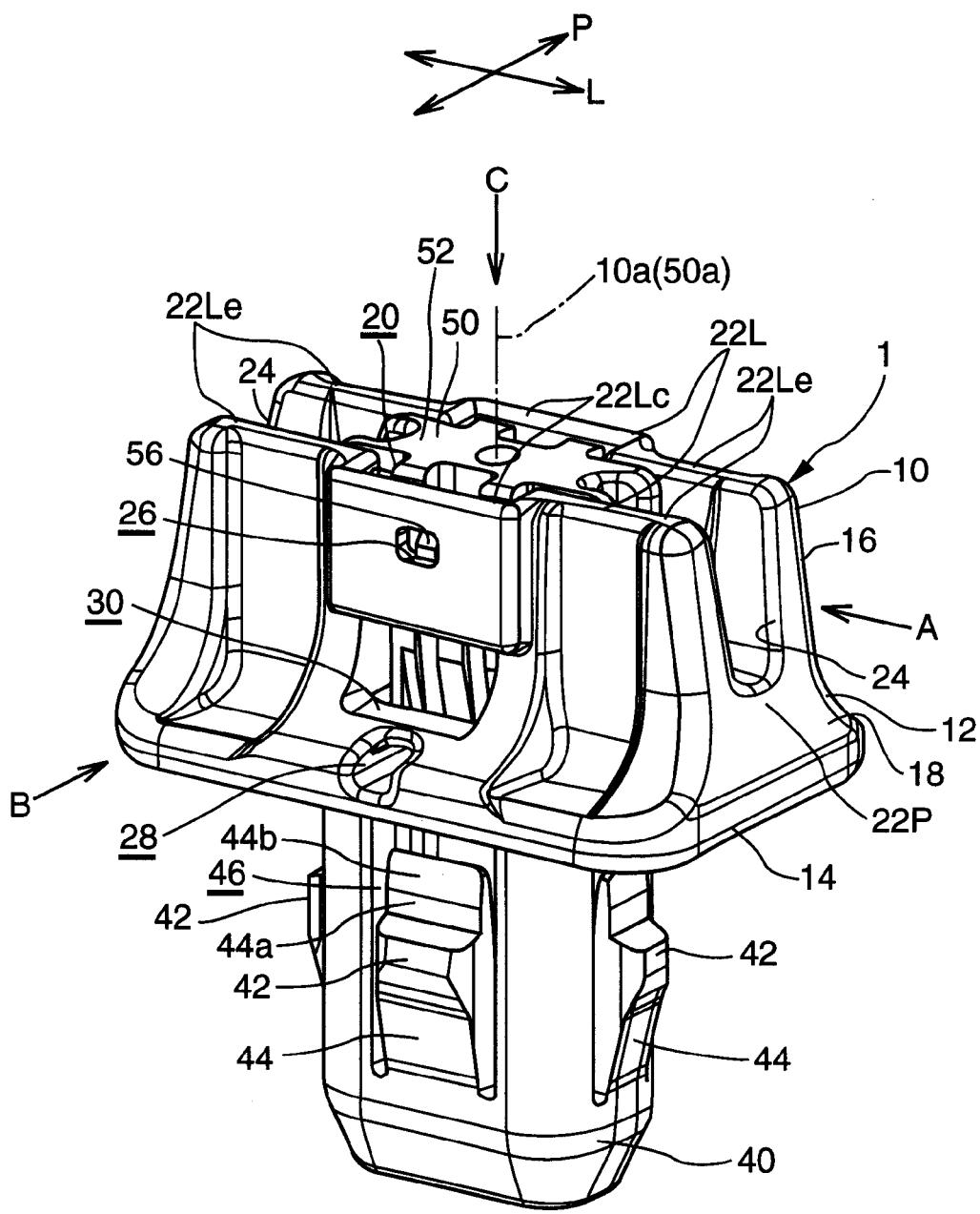
FIG. 2 is a perspective view of the fixing clip (the CSA fixing clip) of FIG. 1 when the lock pin is positioned at a temporary holding position.
Figure 3:
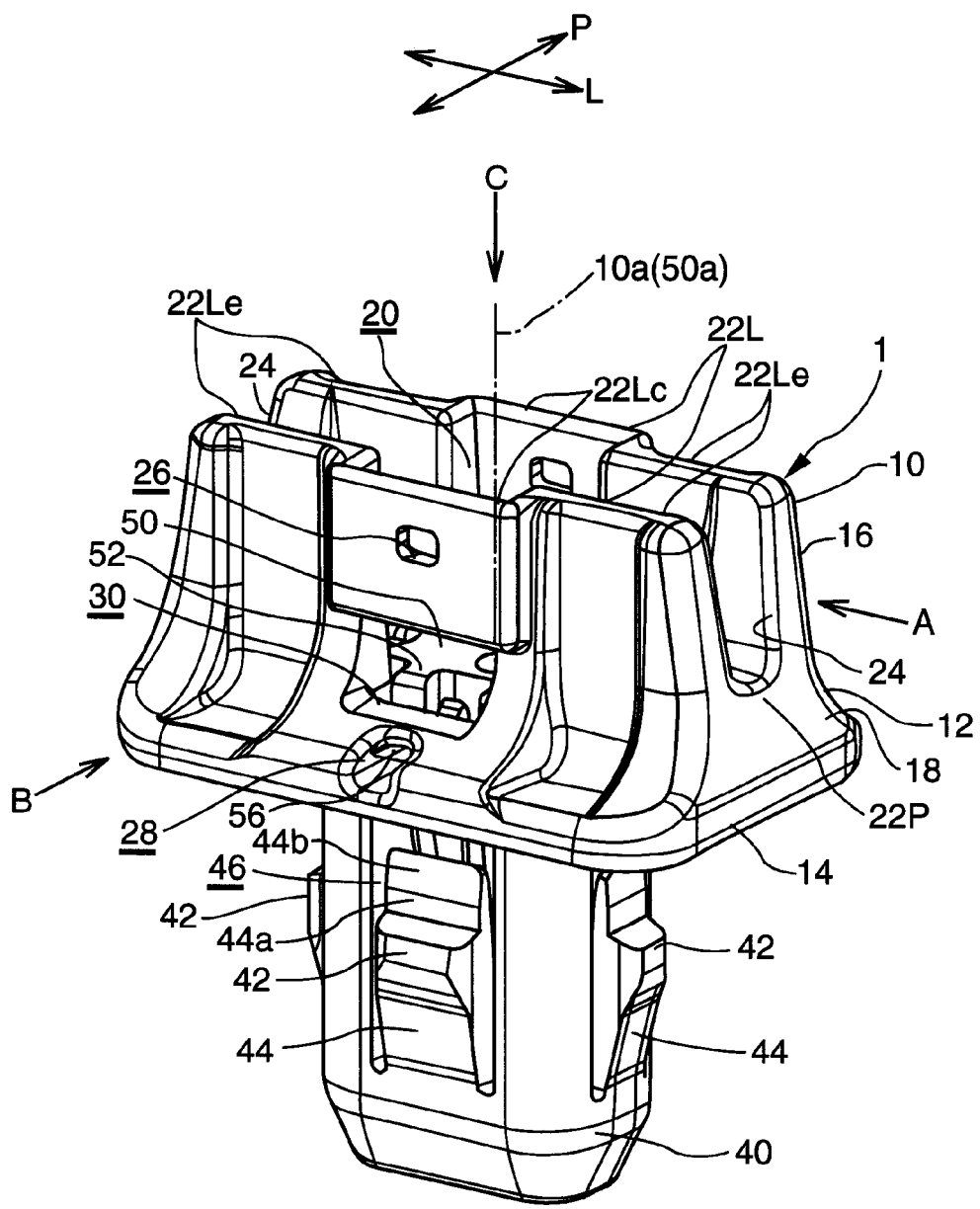
FIG. 3 is a perspective view of the fixing clip (the CSA fixing clip) of FIG. 1 when the lock pin is positioned at a secure holding position.
Figure 4:
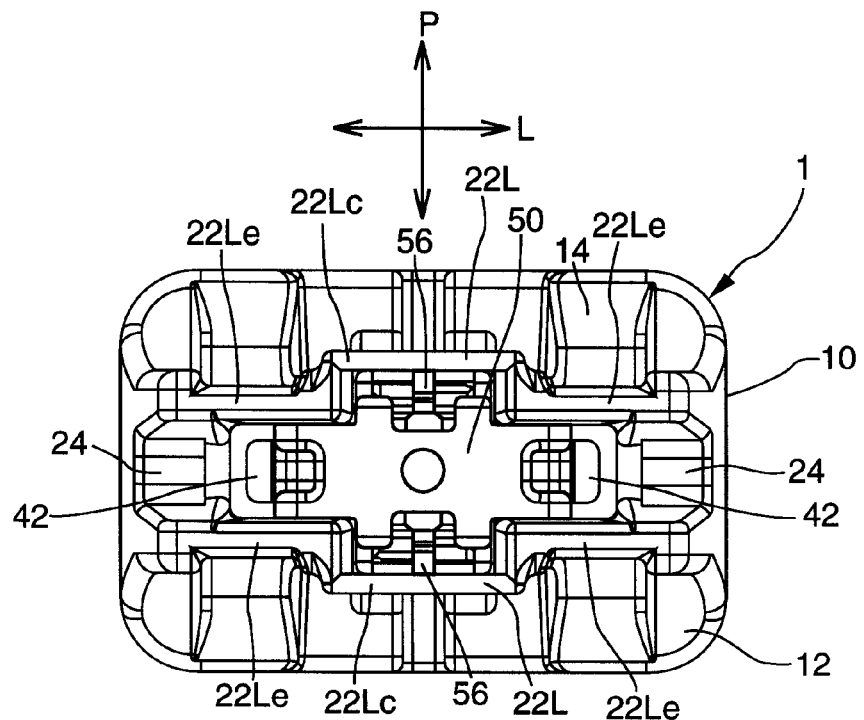
FIG. 4 is a plan view of the fixing clip (the CSA fixing clip) of FIG. 1 when viewed along arrow C in FIG. 2 or FIG. 3.

As illustrated in FIGS. 1-3, the clip body 10 includes a lock pin inserting hole 20 extending along the axis 10a and provided at a central portion of the clip body. An axis of the lock pin inserting hole 20 coincides with the axis 10a of the clip body 10. The lock pin inserting hole 20 is open on a side of the clip body that is opposite to the body leg 40 in a direction along the axis 10a. The lock pin 50 is inserted into the lock pin inserting hole 20 from the open end of the lock pin inserting hole 20. The lock pin inserting hole 20 extends from an upper end of the body head 12 to a bottom wall formed at a lower end portion of the body leg 40, or a vicinity thereof, in a direction parallel to the axis 10a.

Figure 5:
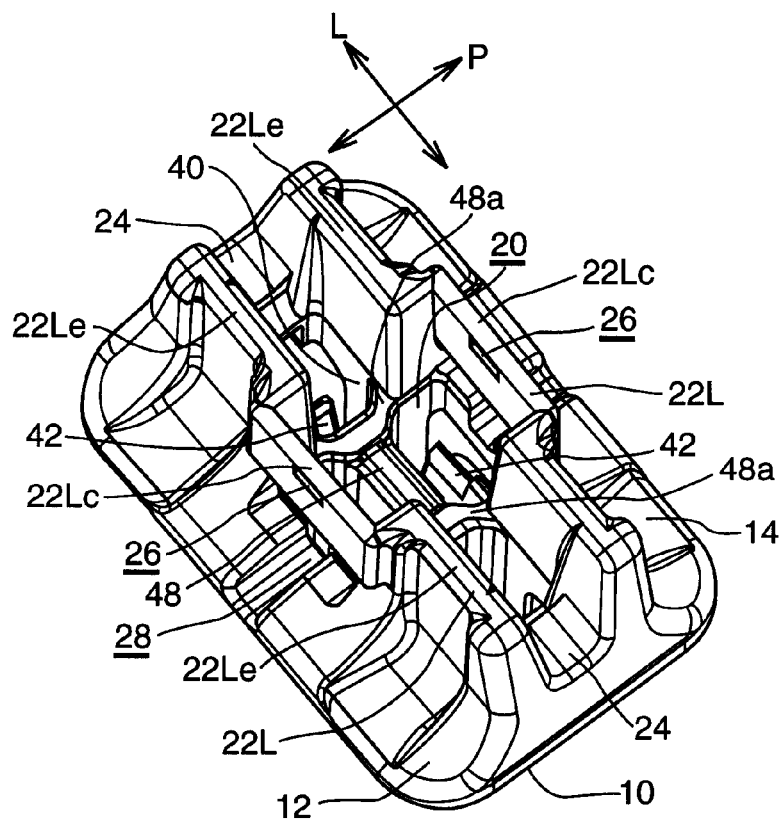
FIG. 5 is a perspective view of a clip body of the fixing clip (the CSA fixing clip) of FIG. 1.
Figure 6:
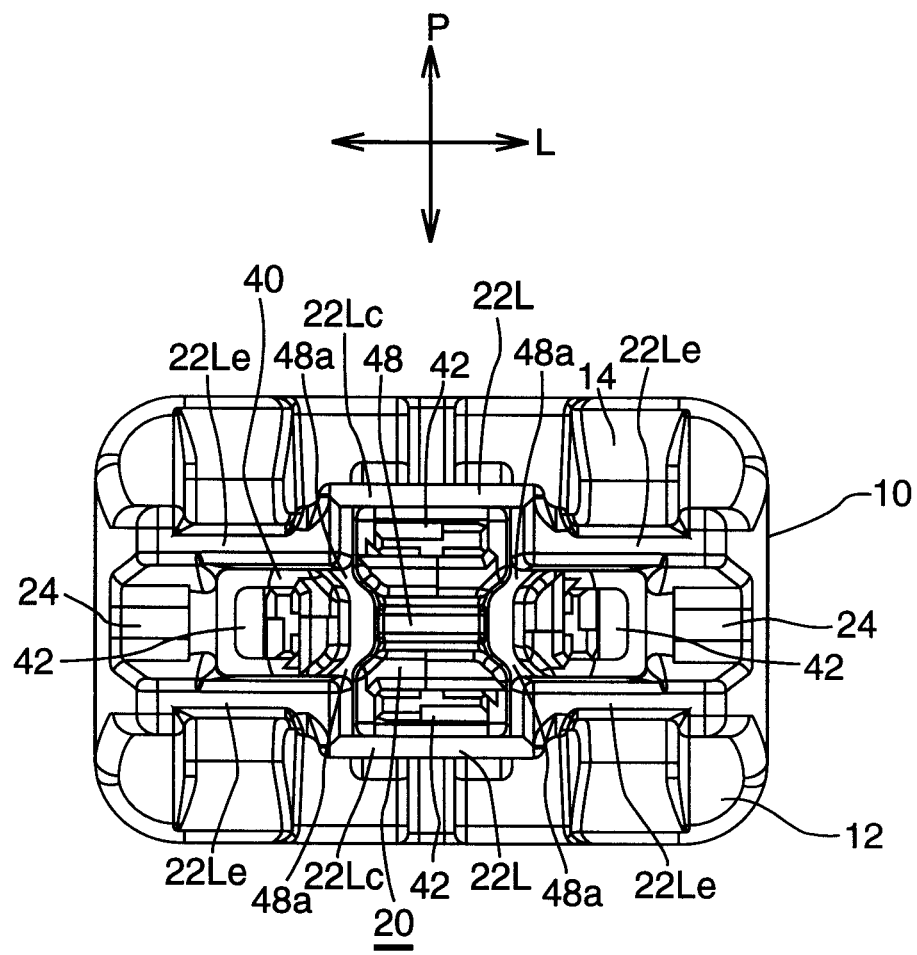
FIG. 6 is a plan view of the clip body of the fixing clip (the CSA fixing clip) of FIG. 1 when viewed along arrow C in FIG. 1.

As illustrated in FIGS. 5 and 6, a back-up rib 48 is provided in the lock pin inserting hole 20. The back-up rib 48 is supported by supporting ribs 48a from inside surfaces of four corners of the body leg 40. The back-up rib 48 extends downward in the axial direction of the clip body 10 from the same height position as an upper surface of the flange 14 to the bottom wall formed at the lower end portion of the body leg 40. Laterally between the back-up rib 48 and the inside surface of the hollow body leg 40, a space is provided where a pin leg 54 of the lock pin 50 can be inserted.

As illustrated in FIGS. 1-6, the body head 12 includes side walls 22L extending in the longitudinal direction L of the CSA and provided on opposite sides of the lock pin inserting hole 20 in the direction P perpendicular to the longitudinal direction of the CSA. The body head 12 further includes side walls 22P extending in the direction P perpendicular to the longitudinal direction of the CSA on opposite sides of the lock pin inserting hole 20. The side walls 22L extend from the flange 14 in the direction opposite the body leg 40 up to an upper end or a tip of the body head 12 in the direction along the axis 10a of the clip body. The side walls 22P extend from the flange 14 in the direction opposite the body leg 40.

Figure 10:
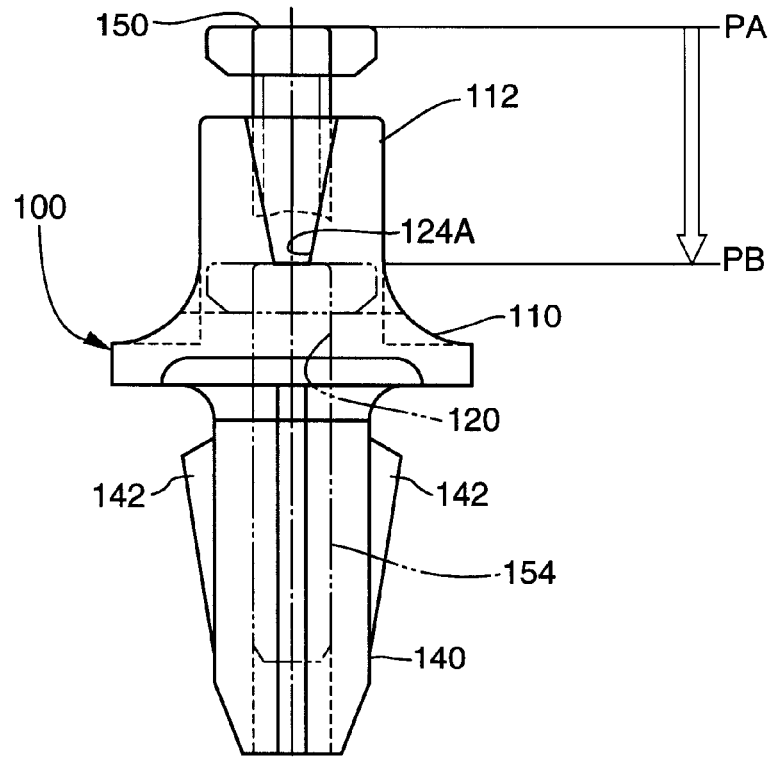
FIG. 10 is a side view of a conventional CSA fixing clip of JP-A-2011-255775 when viewed in a longitudinal direction of the CSA.
Figure 11:
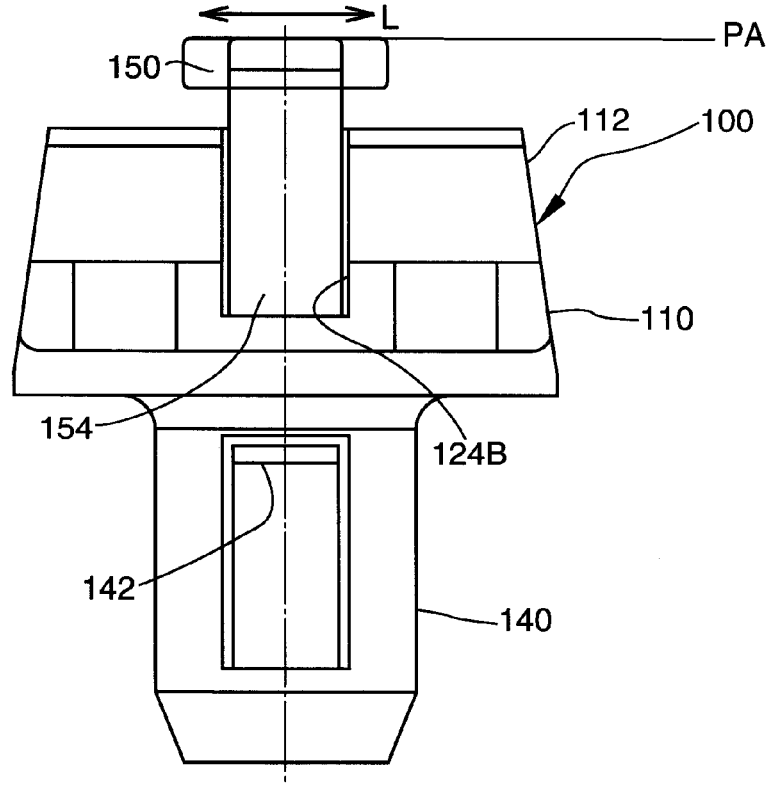
FIG. 11 is a front view of the CSA fixing clip of FIG. 10 when viewed in a direction perpendicular to the longitudinal direction of the CSA.

As illustrated in FIGS. 1-6, at each of the side walls 22L extending in the longitudinal direction L of the CSA, the grooves 124B provided in the conventional clip 100 of FIG. 11 are not provided. Thus, the lock pin inserting hole 20 is covered by the side walls 22L in the direction P perpendicular to the longitudinal direction of the CSA at least at the upper end portions of the lock pin inserting hole as shown in FIGS. 1-3. At the side walls 22P extending in the direction P perpendicular to the longitudinal direction of the CSA, grooves 24 corresponding to the grooves 124A provided in the conventional clip 100 of FIG. 10 are provided. Thus, the lock pin inserting hole 20 opens to an outside through the grooves 24 in the longitudinal direction L of the CSA.

As illustrated in FIGS. 1-6, each of the side walls 22L includes a central portion 22Lc and an end portion 22Le in a direction along the longitudinal direction L of the CSA. A space or a distance between the side walls 22L in the direction P perpendicular to the longitudinal direction L of the CSA is made larger at the central portions 22Lc of the side walls 22L than at the end portions 22Le of the side walls. The space between the inner surfaces of the side walls 22L is set at a dimension larger than a width of a jig which is narrower than a width of a finger of an adult of an average size (AM 50 or AF 50) and at a dimension smaller than the width of the finger of the adult of an average size at both of the central portions 22Lc of the side walls 22L and the end portions 22Le of the side walls. As a result, the jig can enter the space between the inner surfaces of the pair of side walls 22L, but the finger cannot enter the space or it is difficult for the finger to enter the space.

The body leg 40 extends from the flange 14 in a direction opposite the body head 12. A configuration of the body leg 40 viewed along the axis 10a of the clip body, i.e., the configuration of the body leg 40 viewed in a direction along arrow C in FIG. 2 is rectangular. At the side walls of the body leg 40, engagement hooks 42 which are elastically deformable in directions perpendicular to the side walls are provided. Four engagement hooks may be provided such that each of the four engagement hooks is provided at each of the four side walls as illustrated in FIGS. 1-3, or two engagement hooks may be provided such that each of the two engagement hooks is provided at each of the pair of two side walls extending in the longitudinal direction of the CSA as illustrated in FIGS. 10 and 11. An anti-removing strength of the clip body 10 in the case where four engagement hooks are provided is larger than that in the case where two engagement hooks are provided.

At the side wall of the body leg 40, a body deformable portion 44 separate from the side wall by the slit 46 at three sides of the body deformable portion 44 is formed. The body deformable portion 44 is connected to the side wall at a root of the deformable portion 44 which is located at an end of the deformable portion on a side apart from the body head 12. Each engagement hook 42 is formed at a longitudinally middle portion of each body deformable portion 44. An outside portion of the engagement hook 42 protrudes more in a direction perpendicular to the axis 10a of the clip body than an outside surface of the side wall of the body leg 40 in a free state of the body deformable portion 44.

In FIG. 9, when the body leg 40 is fixed to the clip mounting aperture 90d-defining edge of the inner panel 90a, the engagement hook 42 recedes toward the axis 10a of the clip body accompanied by an elastic deformation of the body deformable portion 44 and passes through the clip mounting aperture 90d. After having passed through the clip mounting aperture 90d, the engagement hook 42 returns to an original position due to a spring back action of the body deformable portion 44. Then, the lock pin 50 is moved from the temporary holding position P1 to the secure holding position P2 so that the pin leg 54 is interposed between the engagement hook 42 and the back-up rib 48. At this position, the engagement hook 42 cannot recede toward the axis 10a of the clip body so that the clip body 10 is not removable from the clip mounting aperture 90d-defining edge of the inner panel 90a.

As illustrated in FIGS. 1 and 7, the body deformable portion 44 of the body leg 40 includes an extension 44a extending toward the body head 12 from the engagement hook 42 in the axial direction of the body leg 40. The extension 44a is located closer to the axis 10a of the clip body in the direction perpendicular to the axis 10a of the clip body than an outside surface of the engagement hook 42. At a tip of the extension 44a, a tapered portion 44b is formed. The tapered portion 44b is inclined in a direction toward the axis 10a of the clip body and toward the body head 12. When it becomes necessary to remove the clip body 10 from the clip mounting aperture 90d-defining edge of the inner panel 90a (e.g., for maintenance), first the lock pin 50 is removed, and then a jig (not shown) is inserted into the lock pin inserting hole 20. By pushing the tapered portion 44b with a tip of the jig, that the body deformable portion 44 is deformed toward axis 10a of the clip body thereby causing the outside surface of the engagement hook 42 to recede more inwards than the outside surface of the body leg 40, and then the clip body 10 is removed from the clip mounting aperture 90d-defining edge of the inner panel.

As illustrated in FIG. 1, the lock pin 50 has a pin axis 50a. The lock pin 50 is inserted into the lock pin inserting hole 20 in a state that the pin axis 50a coincides with the axis 10a of the clip body. As illustrated in FIGS. 7 and 8, the lock pin 50 is temporarily held by the clip body 10 when the lock pin 50 is positioned at the temporary holding position P1 at which the lock pin is partially inserted into the lock pin inserting hole 20 of the clip body and is securely held by the clip body 10 when the lock pin 50 is positioned at the secure holding position P2 at which the lock pin is fully inserted into the lock pin inserting hole 20 of the clip body.

A configuration of the lock pin 50 when viewed along the pin axis 50a is rectangular. In a state that the CSA 80 is fixed to the vehicle body 90 by the CSA fixing clip 1 and the lock pin 50 is temporarily or securely held to the clip body 10, a direction in which the longitudinal side of the lock pin 50 extends when viewed along the pin axis 50a and the direction in which the CSA body 80a extends are parallel with each other.

The lock pin 50 includes a pin head 52 having a rectangular configuration and a pin leg 54 extending from the pin head 52 in an insertion direction of the lock pin into the clip body parallel to the pin axis 50a. When four engagement hooks 42 are provided, the pin leg 54 may be provided at each of the four sides of the rectangular pin head 52 so that four pin legs 54 are provided. When two engagement hooks 42 are provided, the pin leg 54 may be provided at each of the two long sides of the rectangular pin head 52 so that two pin legs 54 are provided. The pin legs 54 are separate from each other and are connected to the pin head 52 only.

As illustrated in FIG. 1, at an outside surface of each of only the two pin legs 54 connected to the longitudinal sides of the rectangular pin head 52, a pin deformable portion 58 elastically deformable in a direction perpendicular to the pin axis 50a and a pin hook 56 formed at the pin deformable portion 58 and protruding in a direction away from the pin axis 50a are formed. The pin deformable portion 58 is connected to the pin leg 54 at an end of the pin deformable portion located on a side further from the pin head 52 and extends toward the pin head 52. Since the pin deformable portion 58 is elastically deformable, the pin hook 56 can be elastically displaced in the direction perpendicular to the pin axis 50a.

As illustrated in FIGS. 1-3, 7 and 8, at each of the pair of side walls 22L of the body head 12 of the clip body 10, a temporary holding aperture 26 and a secure holding aperture 28 are formed at a longitudinally middle portion 22Lc of each of the side walls 22L. The temporary holding aperture 26 and the secure holding aperture 28 are located on each of opposite sides of the axis 10a of the clip body in the direction P perpendicular to the longitudinal direction of the CSA and penetrate the longitudinally middle portion 22Lc of each of the side walls 22L. A window 30 may be provided between the temporary holding aperture 26 and the secure holding aperture 28. However, the window 30 may not necessarily be provided. The window 30 and the secure holding aperture 28 may communicate with each other. In a case where the temporary holding aperture 26, the window 30 and the secure holding aperture 28 are provided, they are disposed in that order in the direction from the tip of clip head 12 toward the flange 14 and may be spaced from each other in the direction parallel to the axis 10a of the clip body. An outside surface of the pin hook 56 is located more outward than the outside surface of the pin leg 54. When the lock pin 50 is inserted into the lock pin inserting hole 20, the pin hooks 56 are pushed by the pair of side walls 22L and are elastically displaced toward the pin axis 50a. When the pin hook 56 comes to positions of the temporary holding aperture 26, the window 30 and the secure holding aperture 28, the pin hook 56 protrudes into the temporary holding aperture 26, the window 30 and the secure holding aperture 28 due to its elasticity, respectively.

As illustrated in FIG. 1 and a right half of FIG. 7, the temporary holding aperture 26 is spaced along the axis 10a of the clip body by a certain amount toward the body leg 40 from the tip of the body head 12. The temporary holding aperture 26 is located at a position that does not cause a top surface of the pin head 52 to protrude in a direction opposite the body leg 40 more than the tip of the body head 12 when the pin hook 56 of the lock pin 50 protrudes into the temporary holding aperture 26 and engages the temporary holding aperture 26. Thus, when the lock pin 50 is positioned at the temporary holding position P1, an entirety of the lock pin 50 including the top surface of the pin head 52 is located within the lock pin inserting hole 20. At this position, the top surface of the pin head 52 of the lock pin 50 does not protrude beyond the tip of the body head 12 in the direction opposite the body leg 40.

When the lock pin 50 is positioned at the temporary holding position P1, a lower end of the pin leg 54 of the lock pin 50 is located higher than an upper end of the extension 44a of the engagement hook 42. Thus, when the body leg 40 of the clip body 10 is inserted into the clip mounting aperture 90d of the vehicle body 90, the engagement hook 42 can be deformed toward the axis 10a of the clip body so that the body leg 40 can be mounted to the clip mounting aperture 90d-defining edge of the vehicle body 90.

As illustrated in FIG. 1, the left half of FIG. 7 and the right half of FIG. 8, the secure holding aperture 28 is provided on a side closer to the body leg 40 than the temporary holding aperture 26 in the direction along the axis 10a of the clip body. When the lock pin 50, positioned at the temporary holding aperture 26, is pushed toward the body leg 40, the pin deformable portion 58 is deformed so that the pin hook 56 disengages the temporary holding aperture 26 and is moved toward the body leg 40. When the pin hook 56 comes to the secure holding aperture 26 and protrudes into and engages the secure holding aperture 26, the lock pin 50 is held at the secure holding position P2. When the lock pin 50 is positioned at the secure holding position P2, the lower end of the pin leg 54 of the lock pin 50 is located lower than the upper end of the extension 44a of the engagement hook 42 so that the pin leg 54 is located between the body deformable portion 44 of the body leg 40 and the back-up rib 48. Thus, the engagement hook 42 cannot be deformed elastically toward the axis 10a of the clip body so that the clip body 10 is locked to the vehicle body 90 so as to be non-removable from the vehicle body 90.

When a clip body inserting load is loaded on the clip body 10, the engagement hook 42 is elastically displaced to recede from an original position toward the axis 10a of the clip body and can pass through the clip mounting aperture 90d-defining edge of the vehicle body. After having passed, the engagement hook 42 elastically returns to the original position so that the clip body is fixed to the vehicle body at a clip mounting aperture 90d-defining edge of the vehicle body. The clip inserting load is a load equal to or larger than an abrasion force between the engagement hook 42 and an inner surface of the clip mounting aperture 90d and is a value adjustable by selecting a bending rigidity of the body deformable portion 44.

When a lock pin inserting load is loaded on the lock pin 50, the lock pin is moved from the temporary holding position P1 to the secure holding position P2 accompanied by an elastic displacement of the pin hook 56 of the lock pin 50. When the pin hook 56 comes to the secure holding aperture 28 and protrudes into the secure holding aperture 28, the lock pin 50 is securely held by the clip body 10. The lock pin inserting load is a load that is equal to or larger than an abrasion force between the pin hook 56 and the inner surface of the longitudinally central portion 22Lc of the side wall 22L and is a value that is adjustable by selecting a bending rigidity of the pin deformable portion 58. Though in the conventional clip, the lock pin inserting load is set to be equal to or smaller than the clip body inserting load, in the clip according to an embodiment of the present invention, the lock pin inserting load is set to be larger than the clip body inserting load.

Next, operations and technical advantages of the fixing clip (i.e., the CSA fixing clip) 1 and the CSA fixing apparatus 2 will be explained. Before the CSA 80 is fixed to the vehicle body 90 using the CSA fixing clip 1, the clip 1 is transported and handled in a state in which the lock pin 50 is temporarily coupled to the clip body 10 at the temporary holding position P1.

The lock pin 50 is held by the clip body 10 at the temporary holding position P1. When the CSA 80 is installed in the vehicle body 90, the body leg 40 of the clip body 10 is caused to extend through a hole of the tab 80b of the CSA 80 and a hole of the pushing plate 70 and then is pushed into the clip mounting aperture 90d of the vehicle body 90. When the engagement hook 42 passes the clip mounting aperture 90d, the engagement hook 42 recedes toward the axis 10a of the clip body, accompanied by an elastic deformation of the body deformable portion 44. Due to the elasticity of the body deformable portion 44, the engagement hook 42 returns to the original position, after having passed through the clip mounting aperture 90d. As a result, the clip body 10 is fixed to the vehicle body 90 at the clip mounting aperture 90d-defining edge of the vehicle body.

Then, the lock pin 50 is pushed using the jig so as to be moved from the temporary holding position P1 to the secure holding position P2. Since at the secure holding position P2, the pin leg 54 of the lock pin 50 comes to a position between the body deformable portion 44 and the back-up rib 48, the engagement hook 42 cannot be displaced elastically toward the axis 10a of the clip body accompanied by an elastic deformation of the body deformable portion 44. As a result, the fixing clip (i.e., the CSA fixing clip) 1 is fixed to the vehicle body 90 so as to be non-removable from the clip mounting aperture 90d.

In the conventional clip, sometimes the lock pin 50 was moved from the temporary holding position P1 to the secure holding position P2, due to the receipt of an impact due to collision between clips, during transporting of the CSA fixing clips 1. Further, when the CSA 80 is installed in the vehicle body 90, sometimes the lock pin was erroneously touched by a finger and erroneously moved from the temporary holding position P1 to the secure holding position P2 before the body leg 40 was completely inserted into the clip mounting aperture 90d. In such a case, the engagement hook 42 could not be elastically displaced toward the axis 10a of the clip body so that the body leg 40 could not pass the clip mounting aperture 90d.

In contrast, according to at least some embodiments of the present invention, when the lock pin 50 is positioned at the temporary holding position P1, the lock pin 50 does not protrude upward beyond the top surface of the clip body 10 as illustrated in the right halves of FIG. 7 and FIG. 8. Thus, during transporting of the fixing clips (i.e., the CSA fixing clips) 1, the lock pins 50, which are positioned at the temporary holding positions P1 of the fixing clips, are prevented or suppressed from colliding with each other and from being pushed to the secure holding position P2. Further, when the clip body 10 is fixed to the vehicle body 90, the lock pin 50, positioned at the temporary holding position P1, is suppressed from being erroneously touched by fingers of a workman and from being pushed toward the secure holding position P2. As a result, the lock pin 50 is suppressed from being erroneously moved from the temporary holding position P1 to the secure holding position P2. Thus, a situation in which the fixing clip (i.e., the CSA fixing clip) 1 cannot be fixed to the vehicle body 90 is avoided.

Since the body head 12 includes the pair of side walls 22L on opposite sides of the lock pin inserting hole 20 at the positions where the conventional clip of FIG. 11 had the grooves 124B, when the clip body 10 is pinched at the pair of side walls 22L in a direction perpendicular to a side wall extending direction and is pushed into the clip mounting aperture 90d, fingers of a workman or a jig are prevented from touching the lock pin positioned at the temporary holding position P1 and from erroneously pushing the lock pin 50 from the temporary holding position P1 to the secure holding position P2.

Further, the space between the pair of side walls 22L is set at a dimension larger than the width of the jig which is narrower than a width of a finger of an average-sized workman and at a dimension smaller than the width of the finger. As a result, the lock pin 50 cannot be pushed by the finger. Thus, an erroneous insertion of the lock pin 50 can be further suppressed.

Further, since the lock pin inserting load is set to be larger than the clip body inserting load, even if the clip body inserting load happens to be erroneously loaded on the lock pin 50 when the clip body 10 is pushed into the clip mounting aperture 90d of the vehicle body 90, the lock pin 50 is suppressed from being pushed from the temporary holding position P1 to the secure holding position P2.

Further, with respect to the CSA fixing apparatus 2, since the CSA 80 is fixed to the vehicle body 90 using the CSA fixing clip 1, an erroneous insertion of the lock pin 50 from the temporary holding position P1 to the secure holding position P2 can be suppressed. Thus, the problem of erroneous insertion of the lock pin, while fixing the CSA to the vehicle body can be avoided.

It should be understood that the embodiments of the present invention are not limited to the curtain airbag fixing clip embodiments described above, and that the present invention can be applied to other fixing clips of a lock pin-type.

Although the present invention has been described with reference to specific exemplary embodiments, it will be appreciated by those skilled in the art that various modifications and alterations can be made to the particular embodiments described without materially departing from the novel teachings and advantages of the present invention. Accordingly, it is to be understood that all such modifications and alterations are included within the spirit and scope of the present.

What is claimed is:

1. A fixing clip comprising:
a clip body; and
a lock pin, wherein
the clip body has a lock pin inserting hole formed in the clip body, the lock pin being inserted into the lock pin inserting hole when the lock pin is coupled to the clip body,
the lock pin is temporarily held by the clip body at a temporary holding position, and is securely held by the clip body at a secure holding position where insertion of the lock pin into the clip body is completed, the temporary holding position being located on a way of insertion of the lock pin to the secure holding position, and
when the lock pin is positioned at the temporary holding position, an entirety of the lock pin is located inside the clip body.

2. The fixing clip according to claim 1, wherein
the clip body includes a body head having a rectangular configuration when viewed in a direction along an axis of the clip body and a body leg connected to the body head,
the lock pin inserting hole extends over the body head and the body leg and is open to an outside at a body leg opposite-side end of the body head, and
the body head has side walls extending in a longitudinal direction of the rectangular configuration of the body head on opposite sides of the lock pin inserting hole in a direction perpendicular to the longitudinal direction of the rectangular configuration of the body head.

3. The fixing clip according to claim 2, wherein a space between inner surfaces of the side walls is: i) larger than a width of a jig, which is narrower than an average width of a human finger, and ii) smaller than the average width of the human finger.

4. The fixing clip according to claim 3, wherein
each of the side walls has a longitudinally central portion and a longitudinally end portion in the longitudinal direction of the rectangular configuration of the body head,
the space between the inner surfaces of the side walls is larger at the longitudinally central portion of each of the side walls than at the longitudinally end portion of each of the side walls, and
the space between the inner surfaces of the side walls is larger than the width of the jig and smaller than the average width of the human finger both at the longitudinally central portion of each of the side walls and at the longitudinally end portion of each of the side walls.

5. The fixing clip according to claim 4, wherein
each of the side walls has a temporary holding aperture and a secure holding aperture formed at the longitudinally central portion of each of the side walls,
the lock pin includes a pin head with a rectangular configuration having a long side and a pin leg connected to the pin head at the long side of the pin head and extending along a pin axis,
the pin leg includes a pin deformable portion and a pin hook formed at the pin deformable portion and protruding in a direction away from the pin axis, and
the temporary holding aperture is positioned so as to not cause a top surface of the pin head of the lock pin to protrude outward beyond a tip of the body head in a direction away from the body leg.

6. The fixing clip according to claim 5, wherein
the body leg includes a body deformable portion,
the clip body includes a back-up rib located in the lock pin inserting hole and a space located between the body deformable portion and the back-up rib, the back-up rib being configured to be inserted into the clip body with the lock pin,
when the pin hook is positioned at the temporary holding aperture, a lower end of the pin leg is positioned higher than an upper end of the body deformable portion so that the body deformable portion is elastically deformable toward the axis of the clip body, and
when the pin hook is positioned at the secure holding aperture, a lower end of the pin leg is positioned lower than an upper end of the body deformable portion so that the body deformable portion is not elastically deformable toward the axis of the clip body.

7. The fixing clip according to claim 3, wherein
when a clip body inserting load is loaded on the clip body, the clip body is fixed to a vehicle body at a clip mounting aperture-defining edge of the vehicle body,
when a lock pin inserting load is loaded on the lock pin, the lock pin is moved from the temporary holding position to the secure holding position and is held by the clip body, and
the lock pin inserting load is greater than the clip body inserting load.

8. A curtain airbag fixing apparatus comprising:
a vehicle body including a clip mounting aperture;
a curtain airbag; and
the fixing clip according to claim 1, configured to fix the airbag to the vehicle body at a clip mounting aperture-defining edge of the vehicle body.

* * * * *